United States Patent [19]

Bornhorst, Jr. et al.

[11] Patent Number: 5,661,565
[45] Date of Patent: Aug. 26, 1997

[54] METHOD AND APPARATUS FOR ALIGNING A CYLINDER IN AN ENGRAVER

[75] Inventors: Kenneth F. Bornhorst, Jr., Centerville; Robert D. Likins, Wilmington, both of Ohio; Richard Arnold MacKinnon, Plantation, Fla.

[73] Assignee: Ohio Electronic Engravers, Inc., Dayton, Ohio

[21] Appl. No.: 394,720

[22] Filed: Feb. 27, 1995

Related U.S. Application Data

[63] Continuation-in-part of Ser. No. 57,327, May 5, 1993, Pat. No. 5,424,846.

[51] Int. Cl.⁶ ..................................................... B41C 1/02
[52] U.S. Cl. ............................................................. 358/299
[58] Field of Search ............................................. 358/299

[56] References Cited

U.S. PATENT DOCUMENTS

| | | | |
|---|---|---|---|
| 1,252,274 | 1/1918 | Lingo. | |
| 1,782,272 | 11/1930 | Power. | |
| 1,815,105 | 7/1931 | Howey. | |
| 1,967,004 | 7/1934 | Braden | 82/33 |
| 2,422,785 | 6/1947 | Johnson. | |
| 2,493,628 | 1/1950 | Harley | 88/14 |
| 2,514,970 | 7/1950 | Prickett | 242/68 |
| 2,769,199 | 11/1956 | Boyajean | 18/1 |
| 2,852,265 | 9/1958 | Van Dinen. | |
| 2,874,479 | 2/1959 | Farber | 33/185 |
| 2,881,246 | 4/1959 | Fairchild | 178/6.6 |
| 3,057,238 | 10/1962 | Benes | 82/33 |
| 3,085,813 | 4/1963 | Sampson. | |
| 3,177,742 | 4/1965 | Basso | 82/1 |
| 3,544,713 | 12/1970 | Case et al. | 178/7.1 |
| 3,582,549 | 6/1971 | Hell et al. | 178/69.5 F |
| 3,694,570 | 9/1972 | Kotor et al. | 178/6.6 B |
| 3,756,102 | 9/1973 | Casey | 82/40 R |

(List continued on next page.)

FOREIGN PATENT DOCUMENTS

| | | |
|---|---|---|
| 488843 | 1/1930 | Germany. |
| 6900549 | 7/1970 | Germany. |

OTHER PUBLICATIONS

"Spannzeuge", p., 352, H. Martini, Werkzeuge, Spannzeuge and Schneidenwerkstoffe auf der Leipziger Fruhjahrsmesse 1959.

"Martin Galvanotechik Galvanoplatie Plating", R.G. Martin AG, CH–4106 Therwil, Erlenstrasse 50, Switzerland, undated brochure.

"Think Boomerang System", Rotogravure Cylinder Making System, Fujitoku Co, Tsukuba, Japan, undated brochure.

"Magnetic Antriebstechnik", Magnetic Electromotoren AG, PO Box 267, CH–4410 Liestal, Switzerland, undated brochure.

"Valcus" Screen brochure, undated.

"Datwyler", Max Daetwyler Corporation, 13420 W. Reese Blvd., Huntersville, NC 28078, undated brochure.

(List continued on next page.)

*Primary Examiner*—Eric Frahm
*Attorney, Agent, or Firm*—Jacox, Meckstroth & Jenkins

[57] ABSTRACT

An automatic self-centering chuck system for use on an engraver. The chuck system includes a plurality of jaws which are slidably mounted for movement in a radial direction toward a central aperture of the chuck to clamp a shaft for an engraving cylinder. Each of the jaws is actuated for movement by a lever pivotally mounted within the chuck. The levers are actuated for pivotal movement by an axially reciprocating drawbar which is energized for movement by a series of pneumatic cylinders. The components of the chuck are accurately machined to provide close tolerance, precise movements of the jaws whereby a cylinder will be accurately positioned at the central rotational axis of the chuck. In order to ensure that the precise level of jaw movement is maintained throughout the life the chuck, a lubricant flushing or purging system is provided for flushing normal wear particles from the precision components internal to the chuck.

23 Claims, 10 Drawing Sheets

U.S. PATENT DOCUMENTS

| | | | |
|---|---|---|---|
| 3,770,888 | 11/1973 | de Vos et al. | 178/6.6 B |
| 3,838,258 | 9/1974 | Logan | 235/151.11 |
| 3,949,159 | 4/1976 | Ricards et al. | 178/6.6 B |
| 3,964,382 | 6/1976 | Baar et al. | 101/1 |
| 3,990,133 | 11/1976 | Schalles et al. | 29/27 C |
| 4,003,311 | 1/1977 | Bardin | 101/426 |
| 4,013,829 | 3/1977 | Baar et al. | 358/299 |
| 4,054,081 | 10/1977 | Brown | 90/11 C |
| 4,054,745 | 10/1977 | Norman | 178/4.1 R |
| 4,057,838 | 11/1977 | Doelves et al. | 358/299 |
| 4,092,885 | 6/1978 | Kohori | 82/33 |
| 4,357,633 | 11/1982 | Buechler | 358/299 |
| 4,422,655 | 12/1983 | Waite . | |
| 4,450,486 | 5/1984 | Buechler | 358/299 |
| 4,451,856 | 5/1984 | Buechler | 358/299 |
| 4,612,584 | 9/1986 | George et al. | 358/299 |
| 5,029,011 | 7/1991 | Fraser | 358/299 |
| 5,583,647 | 12/1996 | Izar et al. | 358/299 |

OTHER PUBLICATIONS

"Twin Pilot", Maschinenfabrik Kaspar Walter GmbH Co. KG. Plinganserstrasse 22, 8000 Munchen 70, Germany, undated.

"Chucks and Chuck Jaws", The American Society of Mechanical Engineers, 345 E. 47th St., NY, NY 10017, 1972 (Reaffirmed 1987).

"Buck Logansport", Buck Logansport, 12 W. Linden Ave., Logansport, IN 46947, 1991, pp. 4–5, 9.

"Model 730 Long Stroke Power Chucks and Optional Programmable Stroke Control", Buck Chuck Company, Bulletin 935–2, 4 pgs, 1993.

"Long Stroke (Type V)", Buck Matsumoto, 1 pg., 1991.

"High Speed Thro–Hole Power Operated Chucks", Buck Matsumoto, 1 pg., 1991.

"Collet Chucks", Buck Chuck Company, 4169 Commercial Ave., Kalamazoo, Michigan 49003, Bulletin 931–1,3 pgs., 1993.

"Model 801/802 Hydraulic Rotating Cylinder", Buck Chuck Company, Bulletin 935–3, 4 pgs., 1993.

"Counter Centrifugal High–Speed Power Chucks", Buck Chuck Company, Bulletin 935–1, 2 pgs., 1993.

"Power Operated Chucks & Cylinders", Cushman Industries, 806 Windsor St., Hartford, CT 06102, Catalog #305D, pp. 1–7, 10, undated.

"HAAS Rotary Catalog Sales", 9601 Lurline Ave., Chatsworth, CA 91311, pp. 1, 4–7, 10–11, 14–16, 23, 1995.

"Swivel–Lock: Model H025M", Huron Machine Products, Inc., 228 S.W. 21st Terrace, PO Box 9747, Ft. Lauderdale, FL 33310 –9747, 21 pgs., 1985.

"HOWA Power Chucks", Huron Machine Products, Inc., 4 pgs, undated.

"MicroCentric Precision Air Chucks for Turning, Grinding, Boring & Milling", Micro Centre Corp., 25 Terminal Dr., Plainview, NY 118903, 4 pgs, undated.

"Northfield Precision Air Chucks", Northfield Precision Instrument Corp., 4400 Austin Blvd., PO Box D, Island Park, NY 11558, 12 pgs., 1989.

"Positrol Workholding: Hydraulically Expanded Arbors & Chucks", Positrol, Inc., 3890 Virginia Ave., Cincinnati, OH 45227–3499, 19 pgs, 1987.

"Pratt Burnerd America: The Most Advanced Power & Manual Chucks In the Industry", 1919 N. Pitcher St., Kalamazoo, Mich 49007, Cat. 1089, 26 pgs, undated.

"ROHM Spannzeuge–Chucking Tools", ROHM Products of America, 1301 Atkinson Rd., Suite K, Lawrenceville, GA 30243, Catalog, 46 pgs., 1994.

"Datwyler", Max Daetwyler Corporation, 13420 W. Reese Blvd., Huntersville, NC 28078, undated brochure.

"Twin Pilot", Maschinenfabrik Kaspar Walter GmbH & Co. KG, Pliganserstrasse 22, 8000 Munchen 70, Germany.

The Gravure Association of America, *The Gravure Engraving Manual* (1987).

Balcom, *Basic Rotogravure* (1988).

"Motion adapted to human needs, " Magnetic Antriebstechnik. Pamphlet.

"Linear Actuator P Series . . . ," Infomagnetic Antriebstechnik. Pamphlet.

"MAGPUSH" Linear Actuators. Push–Pull solutions that stand out., Magnetic Antriebstechnik. Pamphlet.

"Telescope Actuators TELEMAG GTL . . . ", Infomagnetic antribstechnik. Pamphlet.

"Telescope Actuators TELEMAG LC 12Z . . . ," Infogmagnetic Antribstechnik. Pamphlet.

"Telescope Actuators TELEMAG HC8A . . . ," Infomagnetic Antriebstechnik. Pamphlet.

"The TELEMAG Pillar. Gives your ideas the right lift", Magnetic Elektromotoren. Pamphlet.

"telemag—the obvious choice for flexibility and economy at work.", Magnetic Electromotorer, Pamphlet.

"Telemag 2–Section, LC12ZWAK," and Telemag 3–Section, LC 12ZWDK. Pamphlet.

"Magnetic Linear Actuators. Right for every application.", Magnetic Antriebstechnik. Pamphlet.

"Think Boomrang System" (undated).

"Martin Galvanotechnik Galvanoplastic Plating", R. Martin AG (undate).

Heimann GmbH, *Drucktechnische Beratung–Graphischer Handel* (Pamphlet, Hamm, Germany, 1984).

Heimann GmbH, *Check–Master* (Pamphlet, Date Unknown).

Ahauser Tiefdruck–Gravuren GmbH & Co., *Engraving Tester ET 2000* (Pamphlet, Date Unknown).

Promatec Graphique, *M2B2 modele depose MICRO SURFACE SARL* (Pamphlet, Antony, France, 1987).

*VIP—Video–Image Processing* (Pamphlet, Author unknown, date unknown).

METHOD AND APPARATUS FOR ALIGNING A CYLINDER IN AN ENGRAVER

CROSS-REFERENCE TO RELATED APPLICATIONS

This a continuation-in-part of U.S. patent application Ser. No. 08/057,327 filed May 5, 1993 U.S. Pat. No. 5,424,846 which is incorporated herein by reference and made a part hereof.

BACKGROUND OF THE INVENTION

This invention relates to an engraver, and more particularly, it relates to a self-centering chuck for supporting a cylinder to be engraved in an engraver.

DESCRIPTION OF RELATED ART

The basic principle of electro-mechanical engraving of an engraving cylinder involves rotating a plated cylinder while actuating an electrically driven tool on an engraving head which cuts or engraves cells or lines into the surface of the plated cylinder. The engraved cylinder is normally used in a web-type gravure printing press for printing paper, plastic or metallic film material. In addition to printing newspapers and magazines, the engraved cylinders may also be used for direct or indirect printing of cloth, applying glue, printing of packaging materials for products, and printing of wood grain patterns for making wall paneling, floor coverings or other surface coverings.

In the gravure printing process, the engraved cylinder is flooded with ink, and a doctor blade wipes off excess ink from the surface so that only the engraved cells contain ink which is transferred to the material being printed. To obtain a high quality print, it is necessary that the cells be very accurately placed or located on the cylinder surface, usually within one or two microns of a desired pre-determined location.

During an engraving operation, the cylinder to be engraved is supported at either end by a headstock and a tailstock. Typically, the cylinder ends are provided with either a receiving opening for receiving support shafts mounted to the headstock and tailstock or are provided with cylinder shafts to be manually positioned within gripping members rotatably mounted on the headstock and tailstock. In the case where the cylinder is provided with end shafts, bearing journals of hardened steel are provided on the shafts to be gripped by the gripping members wherein the surface of the bearing journals is accurately positioned relative to the plated surface of the cylinder to be engraved in order to ensure accurate positioning of the cylinder surface within the engraver as the gripping members grip the bearing journals.

One shortcoming of known systems for mounting cylinders within an engraver includes lack of automatic clamping and centering, as well as difficulties associated with ensuring that the gripping members on the headstock and tailstock accurately position the cylinder at the axial center of rotation for the cylinder. In particular, during extended use, the components forming the gripping members are subjected to wear such that it may be difficult to ensure precise positioning of the cylinder.

A further shortcoming associated with known mounting systems such as gripping members related to the limited throw or travel of gripping members which in turn limits the range of diameters which may be accommodated by a given gripping members. Thus, in order to accommodate different cylinder shaft diameters in prior art systems, it has been necessary to provide different sized gripping members corresponding to the different shaft diameters found on the cylinders. This procedure of providing for different shaft sizes by replacing the gripping members on the headstock and tailstock has been found to be time consuming and labor intensive.

In addition, as a result of the limited travel or throw of the gripping members, the gripping members used in prior art systems provided limited clearance for receiving shafts of the cylinders such that it was necessary to accurately align the cylinder with the gripping members before the cylinder shafts and gripping members could be brought into engagement with each other. This operation has proven to be difficult and time consuming in that engraving cylinders are typically very heavy and difficult to accurately manipulate. Also, because prior art systems were manual (i.e., not automatic) it was difficult to quickly and accurately locate and align the cylinder in the engraver.

Accordingly, there is a need for a mounting system which facilitates mounting of cylinders having different shaft sizes and which facilitates alignment of different cylinders within an engraver. In addition, there is a need for such a system which also provides for accurate location of cylinders within an engraver throughout an extended period of use of the system.

SUMMARY OF THE INVENTION

The present invention provides a method and apparatus for accurately and automatically aligning a cylinder within a desired or predetermined tolerance range in an engraver for an engraving operation.

In one aspect of the invention, an engraver is provided for engraving a cylinder including an engraving head, an aligner for rotatably registering the cylinder within a predetermined tolerance range on the engraving head, a driver for rotatably driving the aligner and a controller suitable for energizing the engraving head and driver so that the engraving head can engrave the cylinder.

In another aspect of the invention, a chuck is provided suitable for use in an engraver, comprising a housing, a spindle rotatably mounted in the housing, a chuck body located on an end of the spindle, a plurality of jaws for gripping a shaft positioned in the chuck and an actuator located in the spindle and coupled to at least one of the plurality of jaws for actuating the plurality of jaws to align the shaft in the chuck.

In a further aspect, the actuator includes pneumatically actuated cylinders for actuating a drawbar or armature. The drawbar is coupled to the plurality of jaws through a plurality of pivot levers or arms which pivot in response to movement of the drawbar. As the pivot arms pivot, they actuate the jaws in sliding movement radially inwardly toward a center portion of the chuck to grip a support shaft for a cylinder.

The movement of the jaws relative to each other is precisely controlled. In addition, actuation of the actuator causes each jaw to move an equal amount radially inwardly and to apply a substantially equal force against a cylinder support shaft in order to align the cylinder in centered relationship relative to the chuck.

In a further aspect of the invention, the chuck is provided with purge passages associated with cooperating moving parts of the chuck. The purge passages permit lubricant to be injected into and purged from the chuck in order to flush normal wear particles from the precision components internal to the chuck.

In another aspect, the invention comprises a method for aligning a cylinder support in an engraver comprising the steps of actuating a plurality of jaws to grip the cylinder support with a substantially even amount of pressure such that the cylinder support becomes aligned with a rotational axis of the engraver.

Therefore, it is an object of this invention to provide a chuck for an engraver which ensures alignment of a cylinder within the engraver.

Another object of this invention is to provide a chuck for an engraver which can mount and align multiple cylinders having different dimensions.

Another object of this invention is to provide a chuck including precisely moveable jaw elements wherein wear of components controlling the movement of the jaw elements is minimized.

Other objects and advantages of the invention will be apparent from the following description, the accompanying drawings and the appended claims.

DETAILED DESCRIPTION OF THE PREFERRED EMBODIMENT

Figure 1:
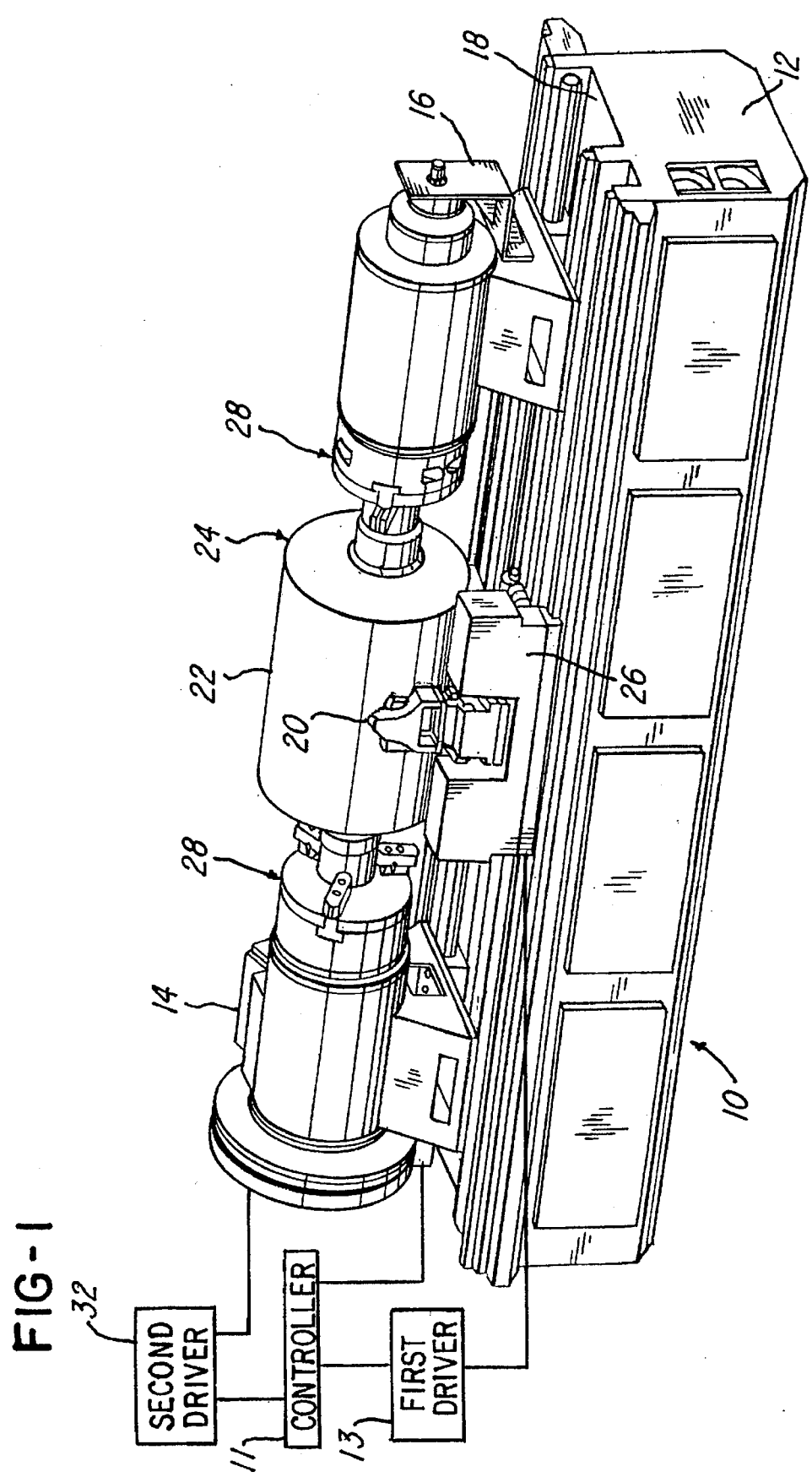
FIG. 1 is a perspective view of an engraver including a headstock and tailstock incorporating the self-centering chuck assembly of the present invention.

FIG. 1 is a general perspective view of an engraver 10 incorporating the self-centering chuck of the present invention. The engraver 10 includes a base 12 having a headstock 14 and tailstock 16 mounted on tracks 18 such that the headstock 14 and tailstock 16 may move towards and away from each other.

The engraver 10 also comprises an engraving head 20 having a cutting tool or stylus (not shown) for engraving a surface, such as a copper plated surface, 22 on a cylinder 24. The engraving head 20 is mounted on a carriage 26 and is adapted to be driven toward and away from the cylinder 24. In addition, the carriage 26 is slidably mounted on the base 12 and driven by a first driver, diagrammatically depicted as 13, such that it is capable of traversing the entire surface 22 of the cylinder 24 in a direction parallel to the axis of the cylinder 24.

The movement of the headstock 14, tailstock 16 and carriage 26 relative to the base 12 may be performed in accordance with drive mechanisms described in co-pending U.S. Pat. No. 5,424,846, which application is assigned to the same assignee as the present invention and which is incorporated herein by reference. In addition, it should be noted that a controller, depicted diagrammatically as 11, is also provided as part of the engraver 10 for automatically controlling the engraving operations, including operation of the self-centering chuck of the present invention, as described below.

Figure 2:
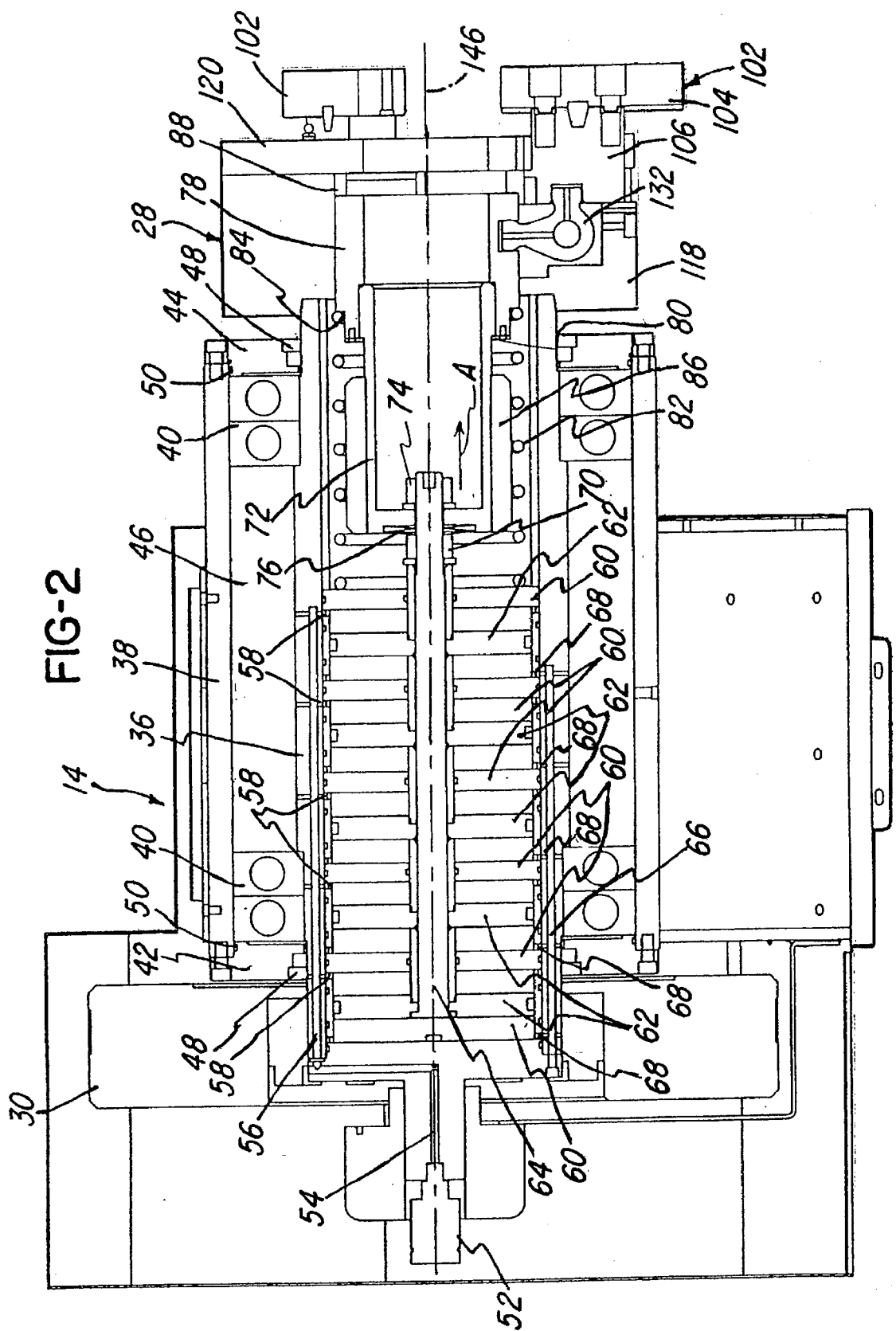
FIG. 2 is a cross-sectional view of a headstock incorporating the chuck assembly of the present invention.
Figure 3:
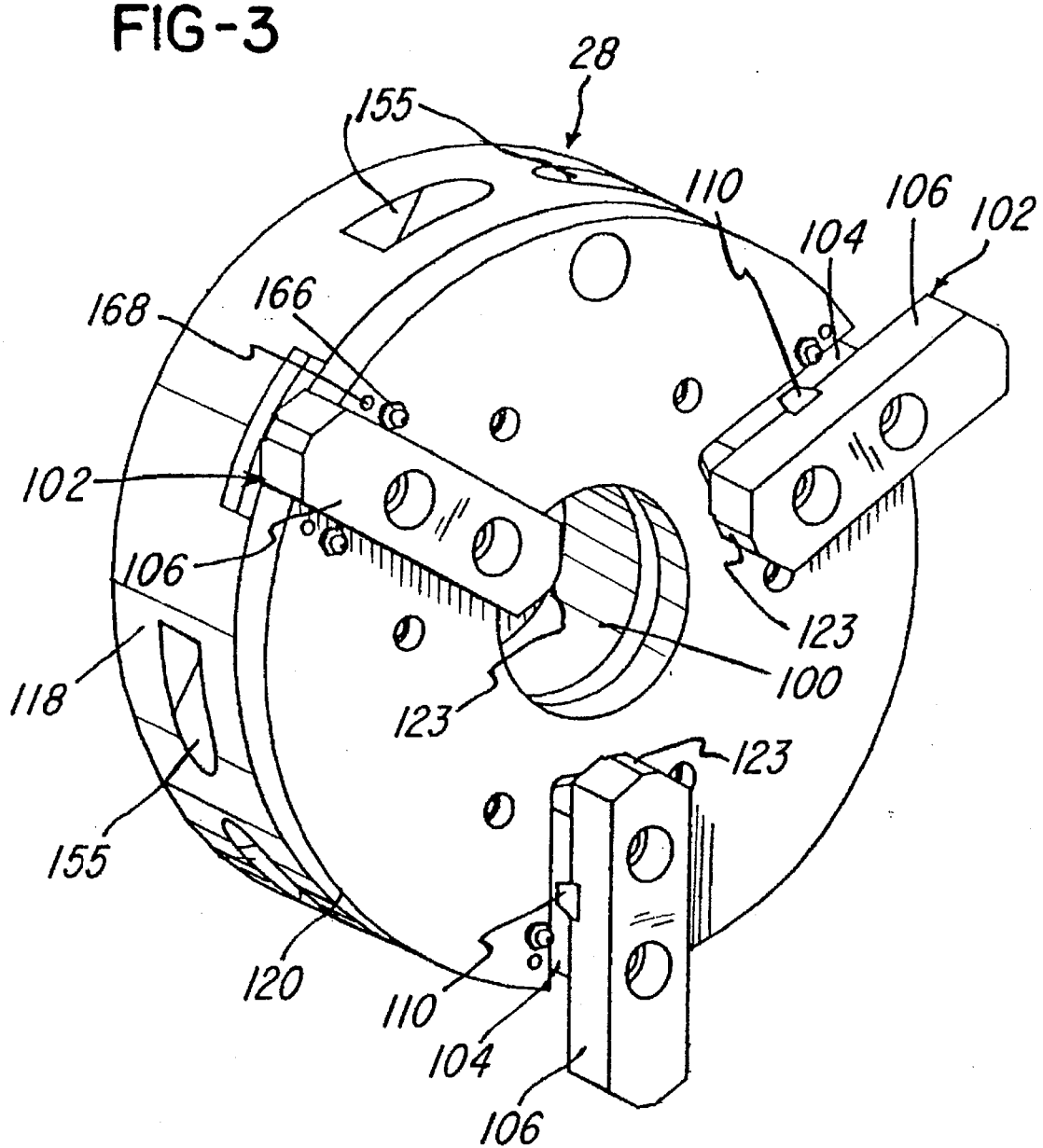
FIG. 3 is a perspective view of the chuck assembly.
Figure 4:
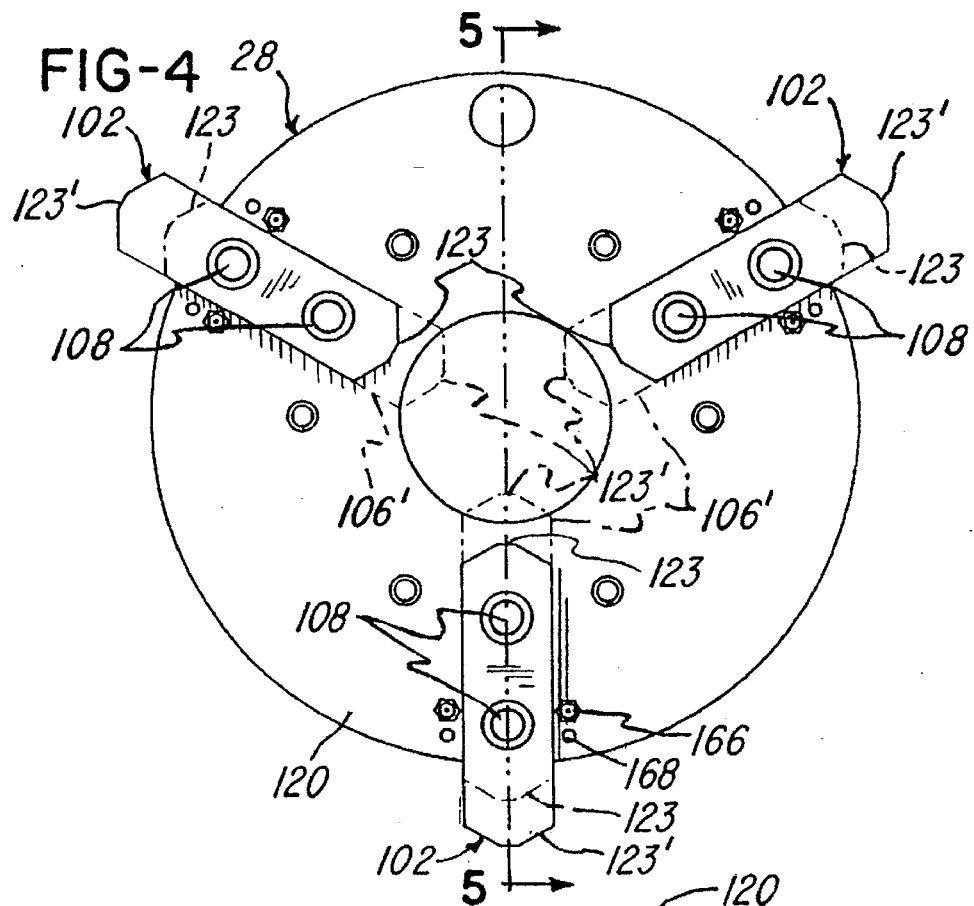
FIG. 4 is an elevational view of the chuck assembly.

Referring to FIG. 2, the self-centering chuck assembly or chuck 28 of the present invention will be described with reference to the chuck 28 found on the headstock 14 and it should be understood that an identical self-centering chuck 28 is also positioned on the tailstock 16 (see FIG. 12). In addition, it should be noted that the structure of the headstock 14 and tailstock 16 is substantially identical with the exception that the headstock 14 includes a flywheel 30 which is driven by a second driver, diagrammatically depicted as 32, which is preferably a rotary drive, such as a belt, gear or equivalent drive mechanism (see FIG. 1). The headstock 14 acts as the driving side of the engraver 10 and the tailstock 16 includes a brake system for accurately stopping the rotation of the cylinder 24 and comprises a follower side of the engraver 10.

The headstock 14 includes a substantially cylindrical spindle 36 which is supported within a spindle housing 38 by means of spindle bearings 40 whereby the spindle 36 is rotatable relative to the spindle housing 38. The spindle 36 is attached to the flywheel 30 such that driving movement for the spindle 36 is provided via the flywheel 30 as it is driven by the rotary drive 32. The bearings 40 are preloaded within the housing 38 by means of a stationary end cap 42 and an adjustable or spanner cap 44. A cavity 46 is defined surrounding the spindle 36 and is filled with oil and the oil is retained within the cavity 46 by means of labrynth seals 48 and stationary seals 50.

Pneumatic pressure is supplied to the interior of the spindle via a rotary union 52 connected to air passages 54, 56. In addition, the air passage 56 opens into the interior of the spindle 36 at a plurality of air entrance ports 58.

The interior of the spindle 36 defines a piston chamber, and a plurality of piston chamber bulkheads 60 are located in stationary relationship to the interior of the spindle 36 at spaced predetermined locations to thereby form a series of subchambers in the spindle 36. A plurality of pistons 62 are also located within the spindle 36 between the bulkheads 60 and are mounted to a substantially cylindrical drawbar or armature 64 for slidable movement relative to the spindle 36. Thus, the bulkheads 60 and pistons 62 effectively form a series of pancake cylinders, with piston portion of each cylinder attached to the drawbar 64.

The drawbar 64 extends through the interior of the spindle 36 in slidable relationship to the bulkheads 60 and rigidly connected to the pistons 62. In addition, an exhaust passage 66 is defined through the spindle 36 and is in fluid communication with each of the subchambers in the interior of the spindle 36 through a plurality of exhaust ports 68. The pistons 62 are actuated for reciprocal horizontal movement within the spindle by means of compressed air supplied through the air entrance ports 58 from rotary union 52 and air passages 54, 56 under control of the controller 11. In addition, the controller 11 is also operable to control air flow through the exhaust passage 66 from the exhaust ports 58.

A drawbar piston assembly locknut 70 is threadably engaged on a chuck side of the drawbar 64 for facilitating rigid placement of the pistons 62 on the drawbar 64. In addition, a substantially cylindrical drawbar tube 72 is attached to the drawbar 64 adjacent to the piston assembly locknut 70 by means of a draw tube locknut 74, and a draw tube takeup spring 76 provides a resilient interface between the draw tube 72 and the piston assembly locknut 70.

The drawbar tube 72 includes an outer end which extends into a groove or recess formed in a substantially cylindrical draw sleeve 78 and is held in engagement with the draw sleeve 78 by means of a drawbar tube retaining plate 80. A resilient biasing member or return spring 82 extends between a rightmost one of the bulkheads 60 (as viewed in FIG. 2) and a shoulder 84 formed in an end of the draw sleeve 78. In addition, a return spring sleeve bushing 86 extends around the draw tube 72 to facilitate proper positioning of the return spring 82 as it extends along the draw tube 72. The return spring 82 biases the draw sleeve 78, draw tube 72 and drawbar 64 in a direction A whereby the pistons 62 are also biased in the direction A within the individual subchambers defined between the bulkheads 60. It should be appreciated that the biasing member could be a double-acting cylinder or other device which facilitates biasing the draw sleeve 78, draw tube 72 and drawbar 64 in the direction of arrow A.

The chuck 28 is affixed to an end of the spindle 36 and includes a passage 88 for slidably receiving the draw sleeve 78 therein. As seen in FIGS. 3–9, the chuck 28 includes a shaft receiving passage 100 extending centrally therethrough and a plurality of elongated jaws 102 are located in circumferentially spaced relation around the opening 100. Specifically, the jaws 102 are angularly spaced 120° apart from each other around the chuck 28.

Figure 5:
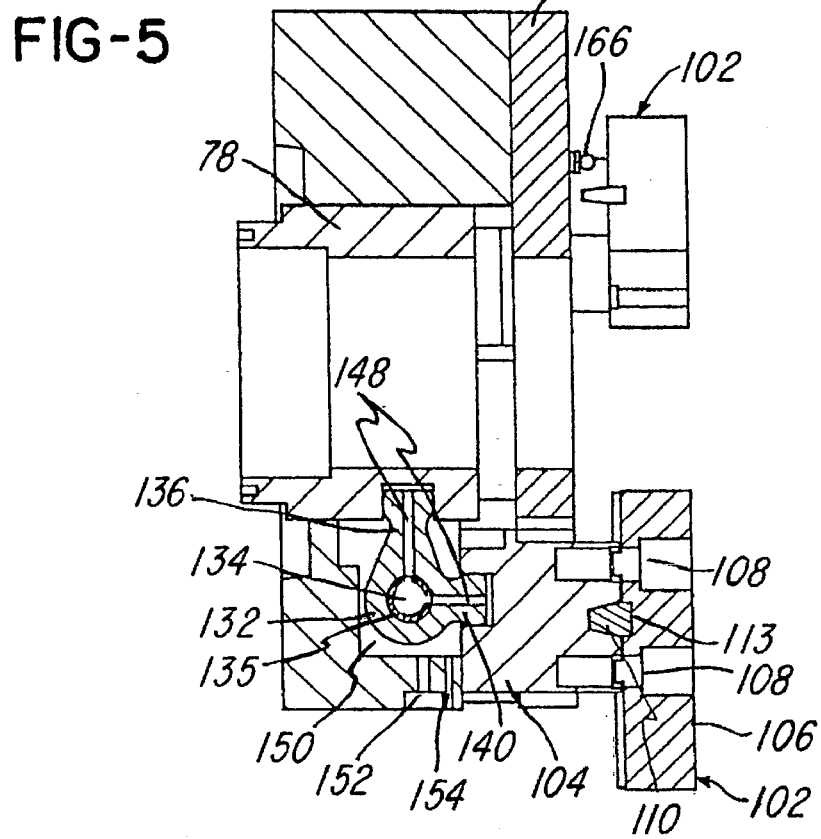
FIG. 5 is a cross-sectional view taken along line 5—5 in FIG. 4.

As best seen in FIG. 5, the jaws 102 each include a master jaw 104 and a top jaw 106 which is bolted to the master jaw 104 by means of bolts at bolt locations 108, 109 on the top jaw 106 and master jaw 104, respectively. A top jaw locating key 110 (see also FIG. 9) is fastened within a recess 111 of the top jaw 106 and includes angled surfaces 112 for engaging within a slot 114 FIG. 8) of the master jaw 104 wherein the angled surfaces 112 cooperate with angled surfaces 116 in the master jaw 104 to facilitate precise alignment between the top jaw 106 and master jaw 104. In addition, alignment is further facilitated by means of an elongated groove 113 formed in the top jaw 106 for receiving a cooperating elongated tongue element 115 formed in the master jaw 104.

Figure 6:
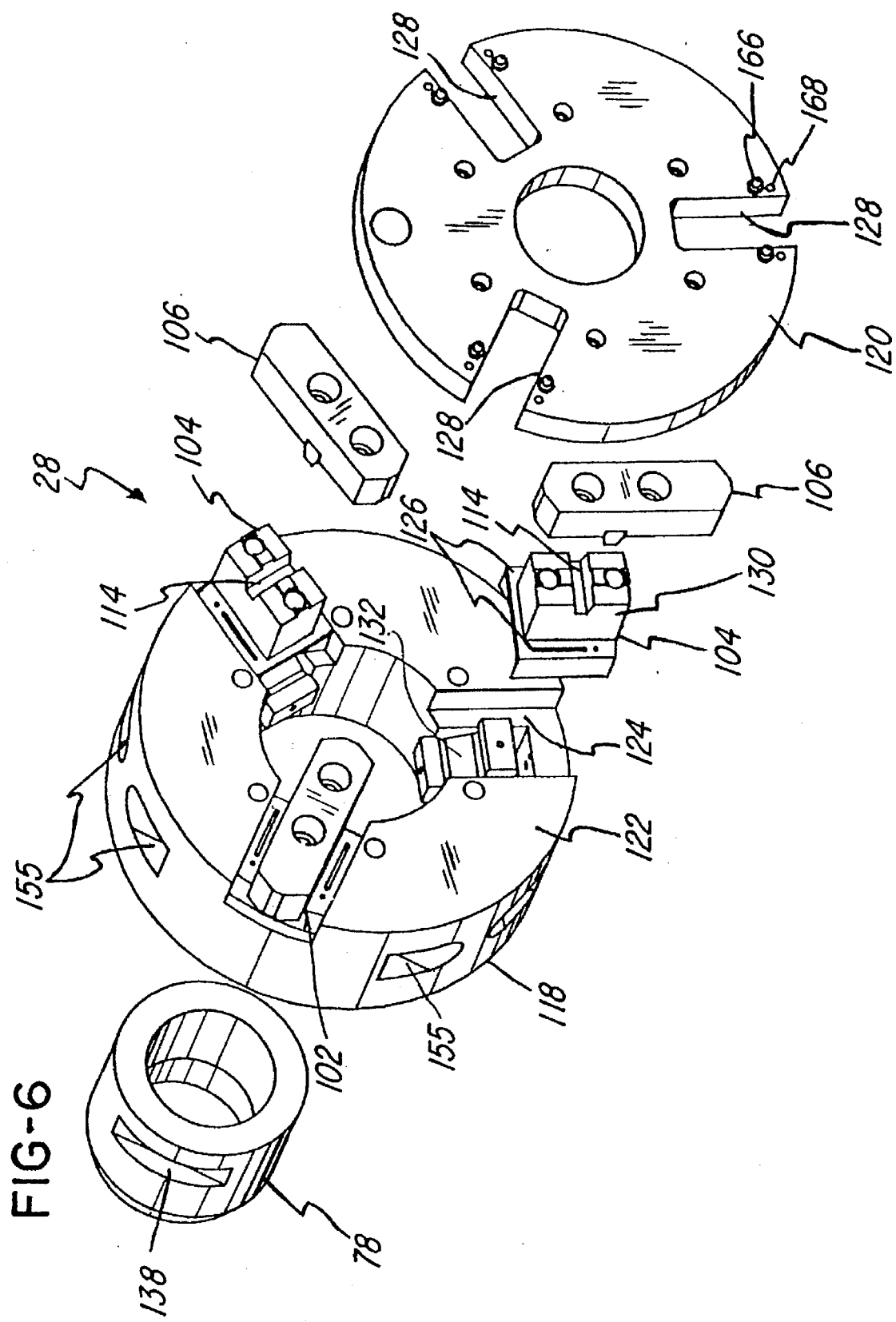
FIG. 6 is an exploded view of the chuck assembly.

As seen in FIG. 6, the chuck 28 includes a chuck body 118 and a chuck top plate 120 attached to a front surface 122 of the chuck body 118. Galleys 124 are defined in the chuck body 118 at the front surface 122 for receiving rearwardly located guide flanges 126 on the master jaw 104. In addition, the chuck top plate 120 includes slots 128 for receiving a forwardly located top jaw mounting portion 130 of the master jaw 104 therethrough. Thus, with the master jaws 104 located within the galleys 124 and the top plate 120 bolted to the front face 122 of the chuck body 118, the master jaws 104 will be retained for sliding movement in the chuck 28.

It should be noted that by providing the two-part assembly of a chuck body 118 and top plate 120, it is possible to provide precisely machined galleys 124 for the master jaw 104 whereby a close to zero tolerance fit is provided for the jaws 102 in their sliding movement. Further, it should be noted that the top jaws 106 are preferably machined close to the desired tolerance prior to installation on the respective master jaws 104. Thereafter, with the top jaws 106 installed on the master jaws 104, the top jaws 106 may be finally machined or ground to a final tolerance value whereby the distance from the central axis of rotation for the chuck to the shaft engaging surfaces 123 on the top jaws 106 is precisely the same for each of the top jaws 106 around the circumference of the chuck 28.

Figure 7:
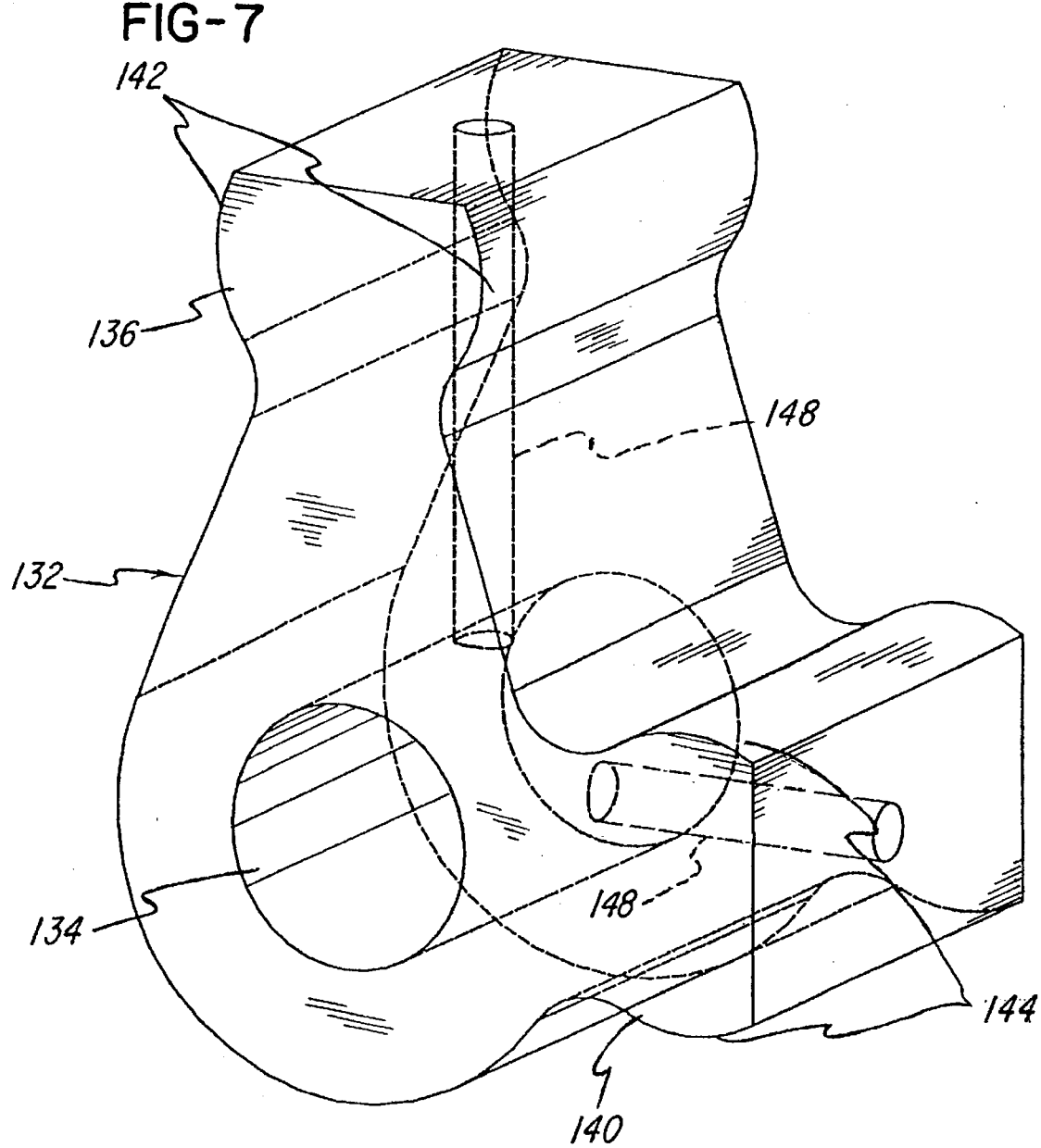
FIG. 7 is a perspective view of a jaw actuating lever for the chuck assembly.

The jaws 102 are actuated for movement by means of a force converter or lever 132 associated with each of the jaws 102. As may be best seen in FIGS. 2, 5 and 7, the levers 132 are mounted for pivotal movement within the chuck body 118 by means of pins 135 at lever pin locations 134. The levers 132 each include a first lever arm 136 for engaging within a respective pocket 138 in the draw sleeve 78 and a second arm 140 for engaging within a pocket 142 in a respective master jaw 104. As seen in FIG. 7, each of the arms 136, 140 is provided with radiused surfaces 142, 144, respectively. The radiused surfaces 142, 144 are contoured such that they maintain engagement with the walls of their respective pockets 138, 142 as the levers 132 pivot such that precise contact is maintained between the arms 136, 140 and the pockets 138, 142.

In operation, the jaws 102 are actuated for movement radially inwardly toward the center of the chuck 128 when the controller 11 causes compressed air to be supplied to the rotary union 52, passages 54, 56 and ports 58 to cause the pistons 62 to move in a leftward direction, opposite to the direction A, viewed in FIG. 2. This causes a leftward movement of the drawbar 64 and causes the draw sleeve 78 to also move in a leftward direction relative to the chuck body 118. As the draw sleeve 78 moves with the drawbar 64, the levers 132 are caused to pivot and move the arms 140 radially inwardly whereby the jaws 102 are caused to move radially inwardly, such that the levers 132 act as couplers between the jaws 102 and the actuation mechanism or actuator formed by the piston cylinders 60, 62, drawbar 64, draw tube 72 and draw sleeve 78. Each of the jaws 102 will move simultaneously the same distance inwardly to cause the shaft engaging surfaces 123 of the jaws 102 to engage and apply a substantially equal pressure to a concentric journal or, in this embodiment, a bearing journal 170 on a shaft for a cylinder. Thus, as the engagement surfaces 123 engage the bearing journal 170, it will be precisely centered relative to a central rotational axis 146 of the chuck 28. Also, it should be noted that the series of pistons 62 located between the bulkheads 60 forms a series pneumatic cylinder arrangement to produce a combined drawbar force of several thousand pounds which acts on the levers 132. Further, the lever action provided via the levers 132 and jaws 102 ensures that a uniform jaw pressure and highly precise self-centering action of the jaws 102 is provided.

At the conclusion of an engraving operation, the controller 11 will cause the pneumatic pressure on the pistons 162 to be relieved, and the spring 82 then acts to push the draw sleeve 78 in the direction A to move the jaws 102 radially outwardly, causing the jaws 102 to release their grip on the cylinder.

Referring further to FIGS. 5 and 7, the levers 132 each include lubricant pilot cavities 148 extending from a central cavity at the pivot location 134 of the lever 132 radially outwardly through the arms 136, 140. The pin 135 for pivotally mounting the lever 132 is preferably provided with a central opening whereby lubricant may be injected through the pivot axis of the lever 132 and the pilot cavities 148. In this manner, lubricant is supplied to the area of the pockets 138 and 142 of the sleeve 78 and master jaws 104, respectively. Further, it should be noted that the lubricant supplied through the pilot cavities 148 flows from the pockets 138, 142 down into a lever cavity 150 whereby the contact area between the surfaces 142, 144 and pockets 138, 142 is flushed or purged to keep this area free of wear particles which may cause abrasion or wear of the cooperating parts.

The lever cavity 150 is provided with a lubricant purge entrance 152 and a lubricant purge exit 154. The lubricant within the lever cavity 150 may be flushed or purged by forcing lubricant into the lubricant purge entrance 152 and the used or contaminated lubricant may exit through the lubricant purge exit 154. Providing for lubricant purging through the lever cavity 150 facilitates maintaining a close tolerance between the arms 136, 140 and their cooperating slots 138, 142 such that the levers 132 will move the jaws 102 with a high degree of precision over an extended period of time without being adversely affected by wear.

It should be noted that the cavity through the pivot axis of the lever 132 may be accessed by means of passages 155 formed in the side of the chuck body 118. Similarly, the lubricant purge entrances and exits 152, 154 are found adjacent to the interface between the master jaw 104 and the top plate 120 and chuck body 118.

Figure 8:
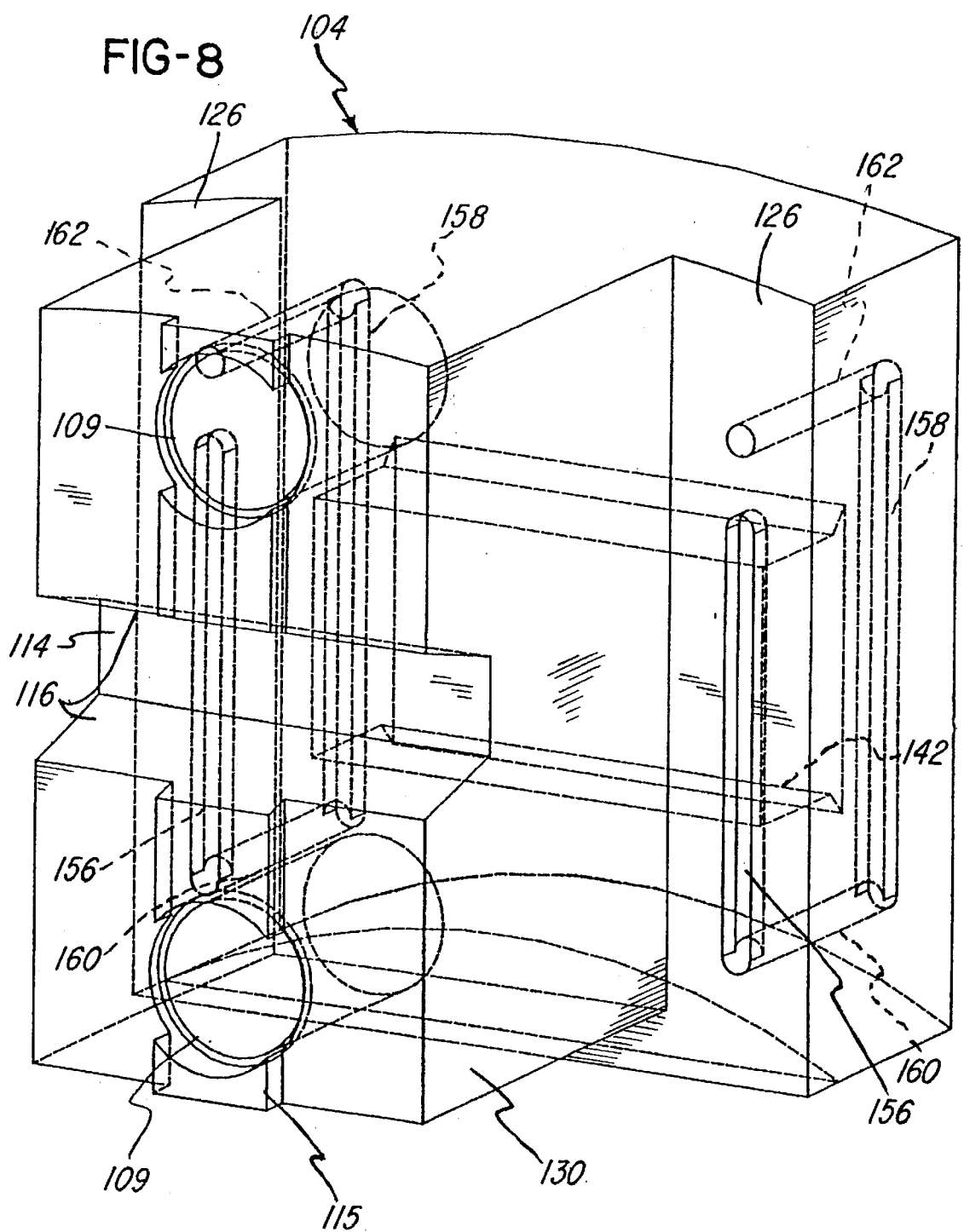
FIG. 8 is a perspective view of a master jaw.
Figure 9:
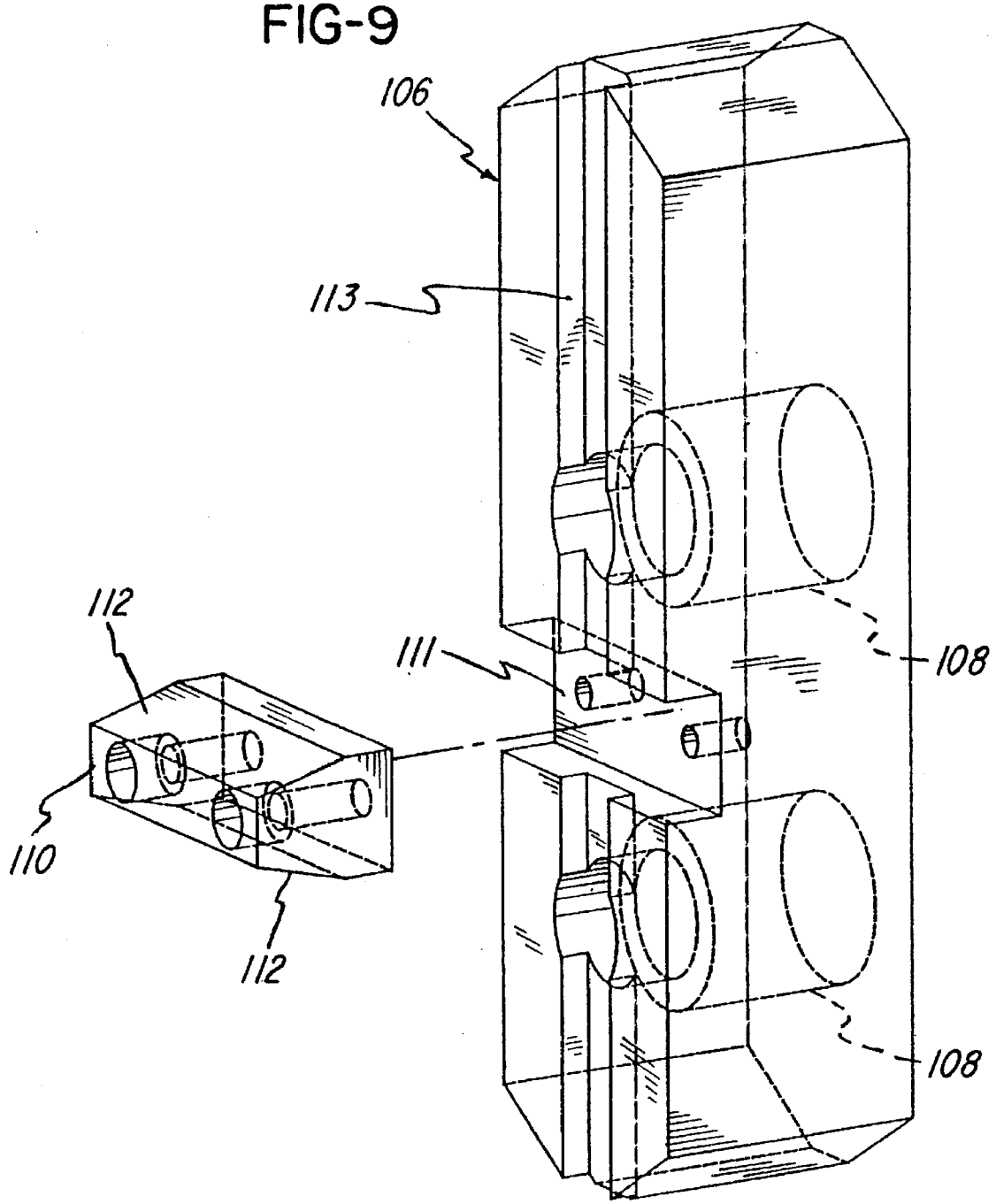
FIG. 9 is a perspective view of a top jaw and top jaw locating key.
Figure 10:
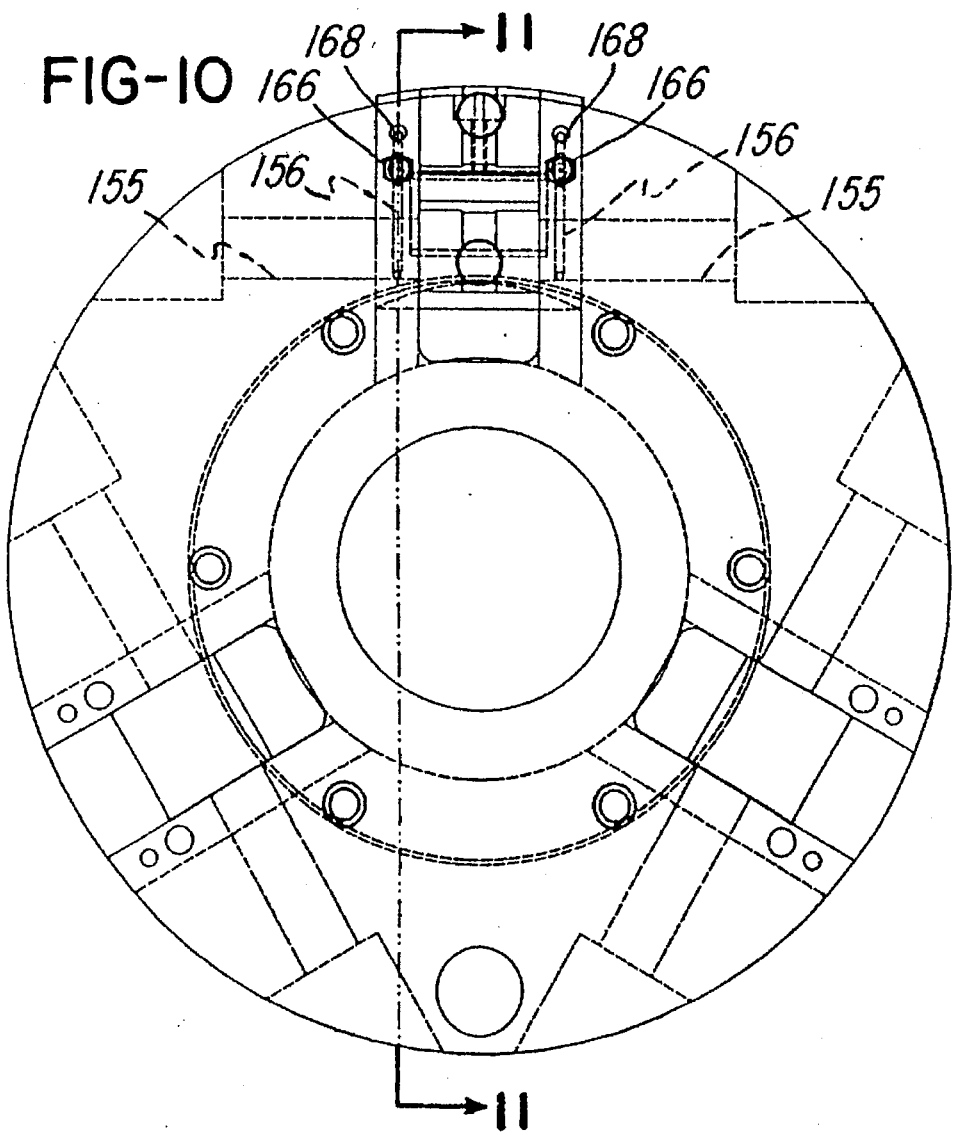
FIG. 10 is a front view of the chuck assembly illustrating the lubricant purge system.
Figure 11:
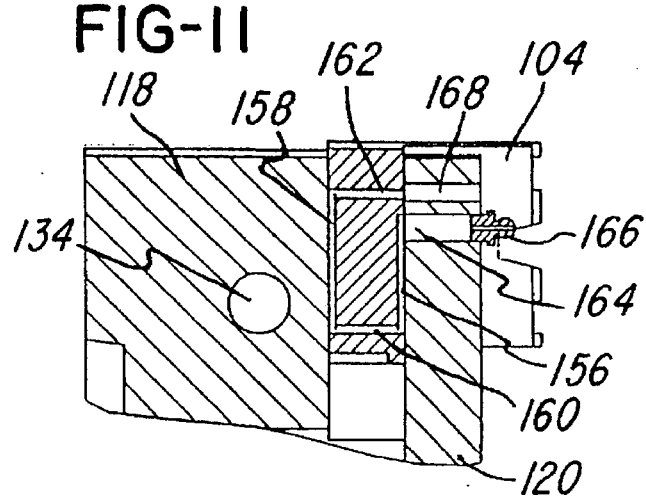
FIG. 11 is a cross-sectional view taken along line 11—11 in FIG. 10.

Referring to FIGS. 8, 10 and 11, the master jaw 104 is provided with front, open elongated channels 156 and rear, open elongated channels 158 formed on each side of the master jaw 104 in the guide flanges 126. A connecting passage 160 connects the front channel 156 to the rear channel 158, and a purge passage 162 extends from the rear channel 158 toward the surface of the flange 126 defining the front channel 156 and opens in spaced relation to the front channel 156.

As may be best seen in FIG. 11, the top plate 120 is formed with a lubricant entrance tube 164 and includes a lubricant fitting 166 located at the entrance thereof. The tube 164 opens into the front channel 156 whereby lubricant may be forced through the front channel 156, the connecting passage 160, the rear channel 158 and the purge passage 162. The top plate 120 is further provided with a lubricant purge exit tube 168 whereby lubricant leaving the purge passage 162 may exit from the chuck 28. It should be apparent that the lubricant passages provided in the master jaws 104 provide for a complete lubricant flushing of both galleys 124 for each of the master jaws 104. Again, it should be noted that the lubricant flushing or purging system for the chuck 28 of the present invention is unique in the present industry in that it ensures that debris which may cause wear is flushed away from the moving parts or the chuck 28 whereby virtually zero wear of the parts is obtained to provide accurate movement of the jaws 102 over an extended period of time.

Figure 12:
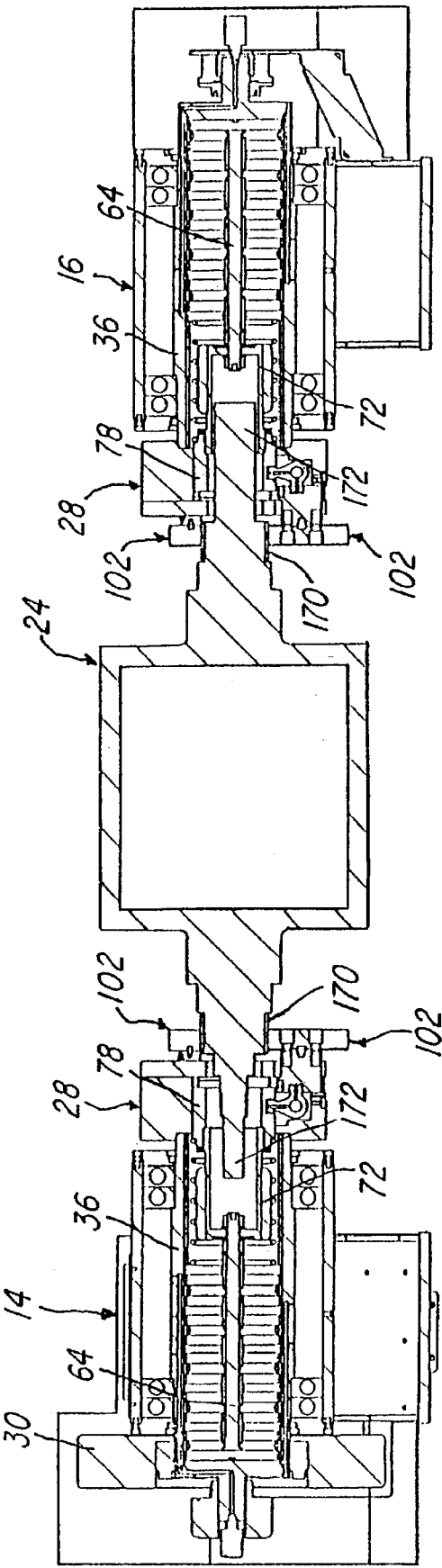
FIG. 12 is a cross-sectional view showing a headstock and tailstock each incorporating the chuck assembly of the present invention and holding an engraving cylinder therebetween.

Referring to FIG. 12, a cross-sectional view of the headstock 14 and tailstock 16 is shown incorporating the chuck 28 of the present invention and holding a cylinder therebetween. It should be noted that the cylinder 24 is typical of the type which the present system is adapted to be used with in that it includes a journal bearing 170 mounted on a shaft 172 at each end which extends a substantial axial distance beyond the journal bearing. It should be apparent that the aperture 100 through the chuck as well as the hollow interior of the draw sleeve 78 and drawbar tube 72 defines a cavity which is substantially rectangular in cross-section and which is particularly configured to receive the additional axial length of the shaft 172 extending beyond the bearing journal 170. This facilitates the use of the present chuck system with a wide variety of different cylinders having different shaft arrangements, including cylinders having extended length shafts.

The present system is also particularly adapted to be used with a wide variety of shaft diameters in that the lever actuated sliding jaw system of the chuck 28 provides a relatively large movement of the jaws 102 to accommodate various diameters of shafts. In particular, the present invention provides for a large travel, or radial movement, of the jaws 102 while maintaining the precise centered position of the engaging surfaces relative to the axis of rotation. The large travel of the jaws 102 facilitates mounting of cylinders in the present chuck 28 in that a wider opening may be provided for receiving a cylinder shaft during a cylinder mounting operation.

Further, the present chuck 28 is adapted to support a wide range of shaft diameters. For example, shaft diameters ranging from less than 1 inch to 4 inches may be accepted by the chuck 28, although the present invention is not intended to be limited to this particular range of diameters. In order to accommodate a wide range of shaft diameters, the top jaws 106 are configured such that they include an engaging surface 123, 123' (FIG. 4) at either end, and may be selectively rotatably indexed with either surface 123 or 123' facing toward the center of the chuck. In the embodiment being described, the top jaws 106 may be rotatably indexed 180 degrees. The engaging surfaces 123, 123' are located at different distances from the jaw mounting locations 108 such that the engaging surfaces 123 are adapted to receive a range of large diameter shafts and the engaging surfaces 123' are adapted to receive a range of smaller diameter shafts. In this manner, the range of cylinder shafts which may be accommodated is easily adjusted without requiring the entire chuck 28 to be dismounted and replaced.

In a method of engraving a cylinder using an engraver incorporating the present self-centering chuck on each of the headstock and tailstock, a cylinder 24 is first situated between the headstock 14 and tailstock 16. The headstock 14 and tailstock 16 are caused to move toward the cylinder 24 until the jaws 102 of each of the chucks 28 are located over the bearing journals 170. The jaws 102 are then actuated by energizing the plurality of cylinders within the spindle 36 to cause the jaws on each of the chucks 28 to grip opposing ends of the cylinder. The cylinder 24 is then rotatably driven by the second driver 32 while the engraving head 26 is energized to engrave the surface of the cylinder.

After the engraving operation, the jaws 102 are released to their normally open position and the headstock 14 and tailstock 16 are moved out of association with the cylinder 24 and the cylinder 24 may be removed from the engraver. Subsequently, a different cylinder may be situated in the engraver for another engraving operation. It should be understood that the second cylinder situated in the engraver may comprise a different size cylinder having different size shafts than the first cylinder, and that the chucks 28 are adapted to accommodate such a cylinder without requiring manual adjustment of the chucks.

It should be apparent from the above description, that the present invention provides a method and apparatus including a self-centering chuck system for use on an engraver wherein automatic self-centering of a cylinder relative to the chuck is provided. The system also includes an actuator which provides a high force gripping action to a plurality of jaws whereby the cylinder will be firmly gripped by the chuck to ensure that the cylinder will be prevented from rotating relative to the chuck during use in an engraving operation. Further, the jaws are configured to provide a large travel and to ensure that true alignment of the engraving cylinder relative to the axis of rotation of the chuck is consistently and accurately provided.

It should also be apparent that the chuck of the present invention provides for a wide range of jaw adjustment to accommodate a wide variety of cylinder shaft diameters, and that a high repeatability in precision jaw movement is possible through the provision of a lubricant purge system for flushing normal wear particles from the precision components internal to the chuck.

Although the above description of the invention has been made with reference to pneumatic actuation of the chuck, it should be noted that other actuation means may be provided. For example, a hydraulic cylinder system could be incorporated to actuate the jaws, or a motor actuated power screw, such as a ballscrew or acme screw may be incorporated.

While the embodiment of the invention herein described constitutes a preferred embodiment of this invention, it is to be understood that the invention is not limited to this precise embodiment, and that changes may be made therein without departing from the scope of the invention which is defined in the appended claims.

What is claimed is:

1. An engraver for engraving a cylinder comprising:
   an engraving head;
   an aligner for rotatably registering the cylinder within a predetermined tolerance range to the engraving head;
   a driver for rotatably driving said aligner;
   a controller suitable for energizing said engraving head and said driver so that said engraving head can engrave said cylinder.

2. The engraver as recited in claim 1 wherein said predetermined tolerance range is about 0.0005 to 0.001 inch.

3. The engraver as recited in claim 1 wherein said aligner comprises:
   at least one aligning chuck rotatably mounted on the engraver for receiving an end of the cylinder to align the cylinder within said predetermined tolerance range.

4. The engraver as recited in claim 3 wherein said cylinder comprises a shaft, said aligning chuck comprises a receiving cavity for receiving said shaft.

5. The engraver as recited in claim 4 wherein said receiving cavity is generally rectangular in cross section and has a width of about 100 mm.

6. The engraver as recited in claim 3 wherein said at least one aligning chuck comprises a plurality of jaw members grip said end of the cylinder, thereby aligning said cylinder within said predetermined tolerance range.

7. The engraver as recited in claim 6 wherein said plurality of jaw members cooperate to provide a travel of about 0–50 millimeters.

8. The engraver as recited in claim 6 wherein at least one of said plurality of jaw members are indexable to facilitate changing a gripping travel of said at least one aligning chuck.

9. The engraver as recited in claim 6 wherein said plurality of jaw members grip said end of said cylinder with a substantially even pressure.

10. The engraver as recited in claim 6 wherein said end comprises a shaft having a concentric journal thereon, said plurality of jaw members being capable of gripping said concentric journal when it is desired to align said cylinder within said predetermined tolerance range.

11. The engraver as recited in claim 10 wherein said predetermined tolerance range is on the order of about 0.0005–0.001 inch.

12. The engraver as recited in claim 6 wherein each of said plurality of jaw members is slidably mounted on said at least one aligning chuck such that they may slide radially towards and away from an axis of said at least one aligning chuck.

13. The engraver as recited in claim 6 wherein said aligning chuck comprises a lubricant system for lubricating said plurality of jaws members.

14. The engraver as recited in claim 13 wherein said lubricant system comprises:
   at least one lubricating channel;
   a plurality of lubricating orifices communicating with said at least one lubricating channel to facilitate introducing and flushing lubricant into said at least one lubricating channel in order to lubricate said plurality of jaw members.

15. The engraver as recited in claim 1 wherein said aligner comprises at least one chuck comprising:
   a plurality of jaw members;
   a spindle;
   an actuator located in said spindle; and
   a converter for coupling said actuator to said plurality of jaw members such that said plurality of jaw members can move towards and away from an axis of said at least one chuck in response to said actuator.

16. The engraver as recited in claim 15 wherein said converter comprises at least one pivot arm coupling said spindle to at least one of said plurality of jaw members.

17. The engraver as recited in claim 15 wherein said actuator comprises a plurality of cylinders aligned in series.

18. The engraver as recited in claim 17 wherein said plurality of cylinders are pancake cylinders.

19. The engraver as recited in claim 15 wherein said actuator comprises a drawbar having a draw tube coupled to said converter;
   said draw tube being substantially cylindrical and having a cylindrical length of less than 250 mm.

20. The engraver as recited in claim 19 wherein said converter operatively couples said draw tube to said plurality of jaw members so that they can move towards and away from the axis of said at least one chuck.

21. The engraver as recited in claim 15 wherein said at least one chuck comprises a chuck body, said converter comprises:
   a pivot pin located in said chuck body;
   a pivot member located on said pivot pin.

22. The engraver as recited in claim 21 wherein said pivot pin and pivot arm comprise at least one channel to facilitate lubricating said pivot pin in said chuck body.

23. The engraver as recited in claim 15 wherein said at least one chuck comprises a chuck body mounted to said spindle, said plurality of jaw members being slidably mounted on said chuck body and said actuator comprising at least one bias member for resiliently biasing said converter to a predetermined position.

* * * * *

UNITED STATES PATENT AND TRADEMARK OFFICE
CERTIFICATE OF CORRECTION

PATENT NO. : 5,661,565
DATED : August 26, 1997
INVENTOR(S) : Bornhorst, Jr. et al.

It is certified that error appears in the above-identified patent and that said Letters Patent is hereby corrected as shown below:

On the title page, section [57], line 14, after "throughout the life", insert --of--.

On the title page, page 2, section [56], delete "Izar et al" and insert --Izor et al-- therefor.

Claim 6, column 9, line 43, delete "grip" and insert --for gripping-- therefor.

Claim 13, column 10, line 9, after "said" insert --at least one--.

Claim 14, column 10, line 17, after "flushing" insert --a--.

Claim 22, column 10, line 50, delete "and pivot arm" and insert --and said pivot member-- therefor.

Signed and Sealed this

Seventeenth Day of February, 1998

*Attest:*

BRUCE LEHMAN

*Attesting Officer*  *Commissioner of Patents and Trademarks*